United States Patent
Sasabe et al.

(10) Patent No.: US 6,730,712 B2
(45) Date of Patent: May 4, 2004

(54) METHOD OF MANUFACTURING POROUS CROSS-LINKED POLYMER SHEET

(75) Inventors: Masazumi Sasabe, Kakogawa (JP); Katsuhiko Sakamoto, Izumisano (JP); Kozo Nogi, Kakogawa (JP); Motohiro Arakawa, Mino (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/169,182

(22) PCT Filed: Sep. 28, 2001

(86) PCT No.: PCT/JP01/08527
§ 371 (c)(1),
(2), (4) Date: Sep. 27, 2002

(87) PCT Pub. No.: WO02/34503
PCT Pub. Date: May 2, 2002

(65) Prior Publication Data
US 2003/0153637 A1 Aug. 14, 2003

(30) Foreign Application Priority Data
Oct. 25, 2000 (JP) ........................................ 2000-325997

(51) Int. Cl.⁷ .................................................. C08J 9/28
(52) U.S. Cl. .......................................... 521/64; 264/138
(58) Field of Search ............................. 521/64; 264/138

(56) References Cited

U.S. PATENT DOCUMENTS 3,244,772 A  *  4/1966  von Bonin et al.
4,522,953 A  *  6/1985  Barby et al.
6,269,724 B1  *  8/2001  Sabatelli et al.
6,299,808 B1  *  10/2001  Mork et al.

FOREIGN PATENT DOCUMENTS

| EP | 837091 | 11/1997 | |
| EP | 0 837 091 A1 | 4/1998 | ............... C08J/9/28 |
| JP | 61-92593 | 6/1986 | ............... B25D/3/28 |
| WO | WO 93/04115 | 3/1993 | ............... C08J/9/40 |
| WO | WO96/21682 | 7/1996 | |
| WO | WO 96/21682 | 7/1996 | ............... C08F/2/32 |
| WO | WO96/40823 | 12/1996 | |
| WO | WO 96/40823 | 12/1996 | ............... C08J/9/28 |
| WO | WO97/27240 | 7/1997 | |
| WO | WO 97/27240 | 7/1997 | ............... C08J/9/28 |
| WO | WO 97/45479 | 12/1997 | ............... C08J/9/28 |
| WO | WO99/16593 | 4/1999 | |
| WO | WO 99/16593 | 4/1999 | ............ B26D/3/28 |

OTHER PUBLICATIONS

Kanebo, Ltd., Microfilm of the specification and drawings annexed to the request of Japanese Utility Model Application No. 177823/1984 (Laid–open No. 92593/1986), Jun. 16, 1986.

* cited by examiner

Primary Examiner—Morton Foelak
(74) Attorney, Agent, or Firm—Fish & Richardson P.C.

(57) ABSTRACT

A method for producing a porous cross-linked polymer sheet capable of slicing quickly is provided. This method comprises a step for obtaining a porous cross-linked polymer by forming and polymerizing an HIPE, a step for dehydrating the porous cross-linked polymer, and a step for subsequently slicing the dehydrated porous cross-linked polymer. According to this invention, by performing the step of dehydration prior to the conventional step of slicing, it is made possible to prevent the porous cross-linked polymer from adhering to the blade and the guides provided for a slicer, and allow the slicing to be attained quickly. By removing the salt from the polymer, it is further made possible to prevent a production device from gathering rust and the porous cross-linked polymer from permitting adhesion of rust thereto.

12 Claims, 5 Drawing Sheets

METHOD OF MANUFACTURING POROUS CROSS-LINKED POLYMER SHEET

TECHNICAL FIELD

This invention relates to a method for producing a porous cross-linked polymer sheet by obtaining a porous cross-linked polymer from a water-in-oil type high internal phase emulsion (hereinafter occasionally referred to briefly as "HIPE"), dehydrating the polymer, and then slicing the dehydrated polymer, and more particularly to a method for producing a porous cross-linked polymer sheet by compressing the polymer thereby removing water therefrom till the water content thereof falls below a prescribed level and thereafter slicing the polymer.

BACKGROUND ART

Regarding the production of a porous polymer formed of continuous cells of a minute and uniform pore diameter, the method for obtaining the polymer by subjecting an HIPE to cross-linking polymerization in the presence of a specific surfactant has been known. The term "HIPE" as used herein is generally interpreted as referring to a disperse phase whose ratio to the total volume of a relevant emulsion exceeds 70 vol. % (K. J. Lissant, Journal of Colloid and Interface Science, Vol. 22, 462 (1966)). U.S. Pat. No. 5,334,621, for example, discloses a method for producing a porous cross-linked polymer by using such an HIPE (hereinafter referred to simply as "HIPE method").

This HIPE method is directed toward producing a porous cross-linked polymer by preparing the HIPE comprising (i) a polymerizable monomer mixture containing an oil-soluble vinyl monomer and a cross-linking monomer possessed of not less than two functional groups in the molecular unit thereof, (ii) a water phase accounting for a proportion of 90 weight %, preferably 95 weight %, and particularly preferably 97 weight % of an emulsion, (iii) a surfactant such as a sorbitan fatty acid ester and a glycerol monofatty acid ester, for example, and (iv) a polymerization initiator and heating the HIPE till it is polymerized and cross-linked. According to this HIPE method, a porous cross-linked polymer comprising reticularly continuous cells is formed by virtue of reversed-phase emulsion polymerization. The porous cross-linked polymer which is obtained by the HIPE method, therefore, possesses low density and such characteristic properties as water absorbing property, water retaining property, heat insulating property, and sound insulating property.

Though the porous cross-linked polymer which has such low density, namely a high hole ratio, is useful for a wide variety of applications, it is not satisfactorily efficient in transportation and storage on account of high bulkiness. With the object of eliminating this defect, International Publication of Unexamined Patent Application 96/40823, for example, discloses a method for producing a compressed porous sheet by preparing a porous cross-linked polymer by the HIPE method and compressing this polymer to one of several parts of the original thickness. The compressed porous sheet so produced possesses the nature of retaining the compressed state and, on exposure to a large quantity of liquid, quickly absorbing the liquid and reverting to the original thickness.

Other methods for producing a porous cross-linked polymer sheet by polymerizing an HIPE are described in Published Japanese Translation of PCT International Publication of Patent Application 6-509834, Published Japanese Translation of PCT International Publication of Patent Application 10-512168, WO97/27240, and WO97/45479, for example.

The method disclosed in Published Japanese Translation of PCT International Publication of Patent Application 6-509834, for example, comprises treating a polymerized water-in-oil type emulsion foam with a surfactant and an agent such as calcium chloride which fulfills the function of imparting hydrophilicity thereby rendering the foam hydrophilic and, while the foam is in used, causing the combination of the surfactant and the hydrate of calcium chloride to furnish the foam with a hydrophilic surface. When the foam happens to have a greater thickness than the product aimed at, the method contemplates slicing this foam. To be more specific, this method in this case resorts to a procedure which comprises slicing a porous cross-linked polymer retaining therein a residual water containing an emulsifying agent, an electrolyte, and an initiator all in a dissolved state in a total quantity 30–40 times the weight of the polymer material with a sharp reciprocating saw blade to obtain sheets 0.35 inch in thickness and then compressing such a sheet with rolls till it is dehydrated.

A similar mention is found in WO97/27240. This publication concerns a means to cure an HIPE and discloses a method for producing a foam by preparing an HIPE, supplying the HIPE to a continuous polymer film, allowing the HIPE on the film to cure, and winding the film into a roll. This invention further contemplates removing the film from the cured foam, slicing the foam into pieces of thin film, and dehydrating and drying the sliced pieces. When the HIPE can be shaped in a thin film, it is no longer necessary to slice the foam. By the method described in the publication, however, the continuous sheet adheres fast to the cured foam and turns eventually to a lining sheet for the foam. Thus, the foam is sliced after the HIPE has cured, and then the sliced foam is dehydrated, washed, and dried.

Then, according to the method disclosed in Published Japanese Translation of PCT International Publication of Patent Application 10-512168, since the HIPE foam which has been formed is packed with a residual water phase substance used in the preparation of the HIPE, this residual water phase substance is removed at least partly before the foam is further worked and put to use. This removal of the residual water phase substance is generally carried out after the foam has been sliced into a sheet measuring about 0.15–0.4 cm in thickness. The sheet thus obtained is compressed as with a porous nip roller to expel the residual liquid.

WO97/45479 teaches a process which comprises obtaining an HIPE having an anionic surfactant incorporated in advance therein, then hardening the HIPE to give rise to a foam, slicing the foam into a sheet 0.35 inch in thickness, then dehydrating the sheet, and compressing the dehydrated sheet to a thickness of 0.045 inch.

Generally, the slicing of a porous cross-linked polymer is effected by rotating at a prescribed speed an endless band knife which is stretched with driving pulleys opposed to each other across the knife. The endless band knife has a construction such that it is nipped by guides disposed on the vertically opposite sides thereof and adapted to allow the band knife to protrude slightly from the gap between the guides, with the result that the protruding band knife will slice the porous cross-linked polymer. When the continuously cured HIPE is sliced, therefore, the practice of continuously conveying a long cured HIPE strip to the band knife and slicing it into a sheet of a fixed thickness or successively slicing it into sheets of a prescribed thickness is generally adopted.

When the porous cross-linked polymer obtained by polymerizing the HIPE is sliced, however, the sliced pieces of the porous cross-linked polymer each in the form of a thin film adhere to the guides disposed as vertically opposed to each other across the band knife. This adhesion prevents the sliced pieces from smoothly moving on the guide faces and entails the possibility of suffering the porous cross-linked polymer to sustain a fold, a fracture, or a crack. The crack so inflicted degrades the product in quality. The prevention of this degradation of quality requires to lower the slicing speed and the decrease of the slicing speed forms a cause for retarding the production process.

Further, as disclosed in Published Japanese Translation of PCT International Publication of Patent Application 6-509834, the water phase during the preparation of the HIPE is incorporated therein such a salt as calcium chloride due to smooth progress of the emulsification. Since calcium chloride so added is contained in its unaltered form in the cured HIPE, is formed a cause for corroding the slicing band knife or the slicing device proper.

The generation of rust due to the corrosion possibly entails such a trouble as adhesion of rust to the sliced pieces. The porous cross-linked polymer which is obtained is generally used as a sound insulator and a heat insulator for absorbing sound and heat, as bases to be impregnated with such chemicals as an aromatizing agent and detergent, and as absorbents for oils and organic solvents. It can be also used as sanitary materials such as disposable diapers and sanitary articles, and as cosmetic articles and medical preparations which by nature directly contact the human body. When it is used particularly as a medical material or a sanitary material, the porous cross-linked polymer forming a finished product is required to have the surface thereof rendered incapable of appreciably stimulating the skin to the fullest possible extent with a view of preventing the contact from inflicting rush on the skin or imparting unpleasant feeling thereto. The security of the safety of using the material forms an important requirement.

This invention, therefore, intends to develop a method for producing a porous cross-linked polymer sheet with excellent efficiency which enables the porous cross-linked polymer to be sliced and transported without sustaining damage such as a fold or a crack and to be increased slicing speed without inducing the problem of the corrosion of the slicing device or the adhesion of rust to the sliced pieces.

DISCLOSURE OF THE INVENTION

This invention has originated in the discovery that by subjecting a porous cross-linked polymer produced by polymerizing the HIPE in an expected shape to a preparatory step of dehydration and a subsequent step of slicing, the shaped polymer is enabled to increase the mechanical strength of the material thereof and allow the material to be sliced and then transported without inducing damage such as a fold or a crack and that by performing this procedure, it is made possible to exalt the slicing speed, improve the slicing device in resistance to corrosion, and obtain a porous cross-linked polymer sheet incapable of inducing the sliced pieces to incur such trouble as adhesion of rust thereto. This invention has been perfected as a result.

Specifically, the object of this invention mentioned above is accomplished by the following items (1) and (2).

(1) A method for the production of a porous cross-linked polymer sheet, comprising a step for obtaining a porous cross-linked polymer by forming and polymerizing an HIPE, a step for dehydrating the porous cross-linked polymer, and a step for subsequently slicing the dehydrated porous cross-linked polymer.

(2) A method for the production of a porous cross-linked polymer sheet, comprising a step for obtaining a porous cross-linked former-stage polymer by forming an HIPE and subjecting the formed HIPE to a former-stage polymerization, a step for dehydrating the porous cross-linked former-stage polymer, a step of subsequently slicing the porous cross-linked former-stage polymer into pieces of a prescribed thickness, and a step for subjecting the porous cross-linked former-stage polymer to a latter-stage polymerization thereby obtaining a porous cross-linked polymer.

According to this invention, by performing the step for dehydration prior to the conventional step for slicing, it is made possible to prevent the porous cross-linked polymer from adhering to the blade and the guides provided in the slicer, allow the polymer to be sliced quickly, and as well prevent the production device from gathering rust and adhering to the porous cross-linked polymer owing to the removal of a salt.

BEST MODE FOR EMBODYING THE INVENTION

The first aspect of this invention concerns a method for the production of a porous cross-linked polymer sheet, comprising a step for obtaining a porous cross-linked polymer by forming and polymerizing an HIPE, a step for dehydrating the porous cross-linked polymer, and a step for subsequently slicing the dehydrated porous cross-linked polymer and the second aspect of this invention concerns a method for the production of a porous cross-linked polymer sheet, comprising a step for obtaining a porous cross-linked former-stage polymer by forming an HIPE and subjecting the formed HIPE to a former-stage polymerization, a step for dehydrating the porous cross-linked former-stage polymer, a step of subsequently slicing the porous cross-linked former-stage polymer into pieces of a prescribed thickness, and a step for subjecting the porous cross-linked former-stage polymer to a latter-stage polymerization thereby obtaining a porous cross-linked polymer.

Figure 1:
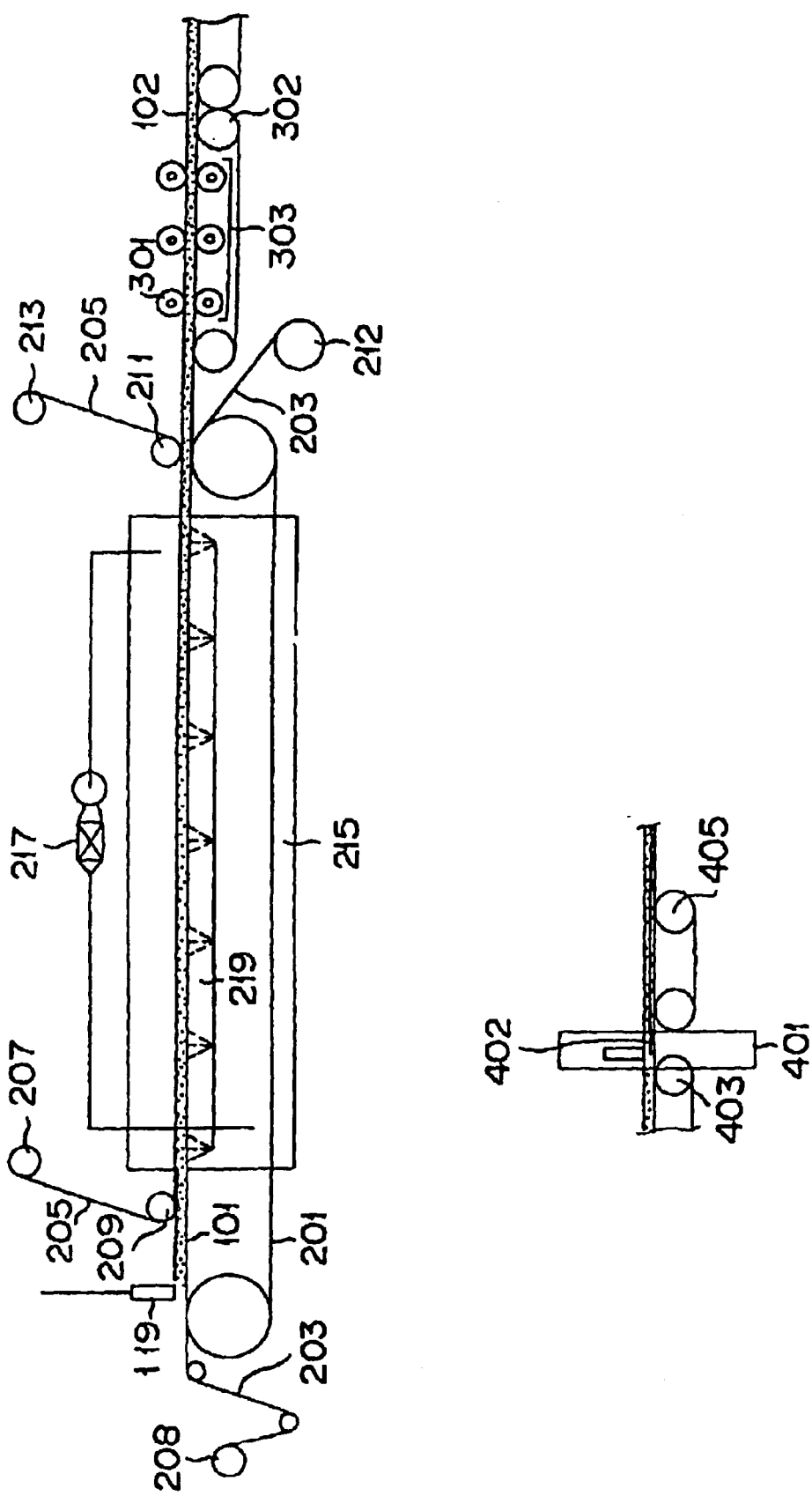
FIG. 1 is a schematic side view illustrating a typical working example of the continuous polymerization device which is suitable in the method of this invention for the production of a porous cross-linked polymer.

First, this invention which produces a porous cross-linked polymer by forming and polymerizing the HIPE will be described below as a method for continuous production with reference to the schematic diagrams of FIG. 1 and FIG. 2. As illustrated in FIG. 1, an HIPE 101 is continuously supplied from an HIPE supplying part 119 onto a sheet member 203 and is formed in the shape of a sheet of a prescribed thickness by adjusting the set height of a rotary roller 209.

The rotating speeds of an unwinding and a rewinding roller 208, 212 are controlled so as to synchronize the sheet member 203 with a conveyor belt 201. A sheet member 205 has the rotating speed thereof controlled by the rotary roller 209 and a rotary roller 211 and a unwinding and a rewinding roller 207, 213 while it is held under such a tension as to fix the thickness of the HIPE 101. By a heating means 219 formed of hot water showers and disposed below the conveyor belt 201 and a heating means 217 formed of hot air circulating devices and disposed above the conveyor belt 201, the HIPE 101 in a polymerizing furnace 215 is polymerized to form a porous cross-linked polymer 102. The polymer stripped of the upper and lower sheet members 203, 205 is mounted on the belt being rotated with a conveyor 302 driven by a rotary roll of a dehydrating device 303, nipped between compressing rolls 301 vertically opposed to each other across the belt, and dehydrated by rotating the rolls. The porous cross-linked polymer 102 which has been dehydrated is transferred to a continuously disposed endless band knife type slicer 401 and sliced in the direction of thickness with a band knife 402 kept in rotation. The polymer 102 is shredded in the vertical direction with guides (not shown) disposed on the upper and lower faces of the band knife.

Figure 2:
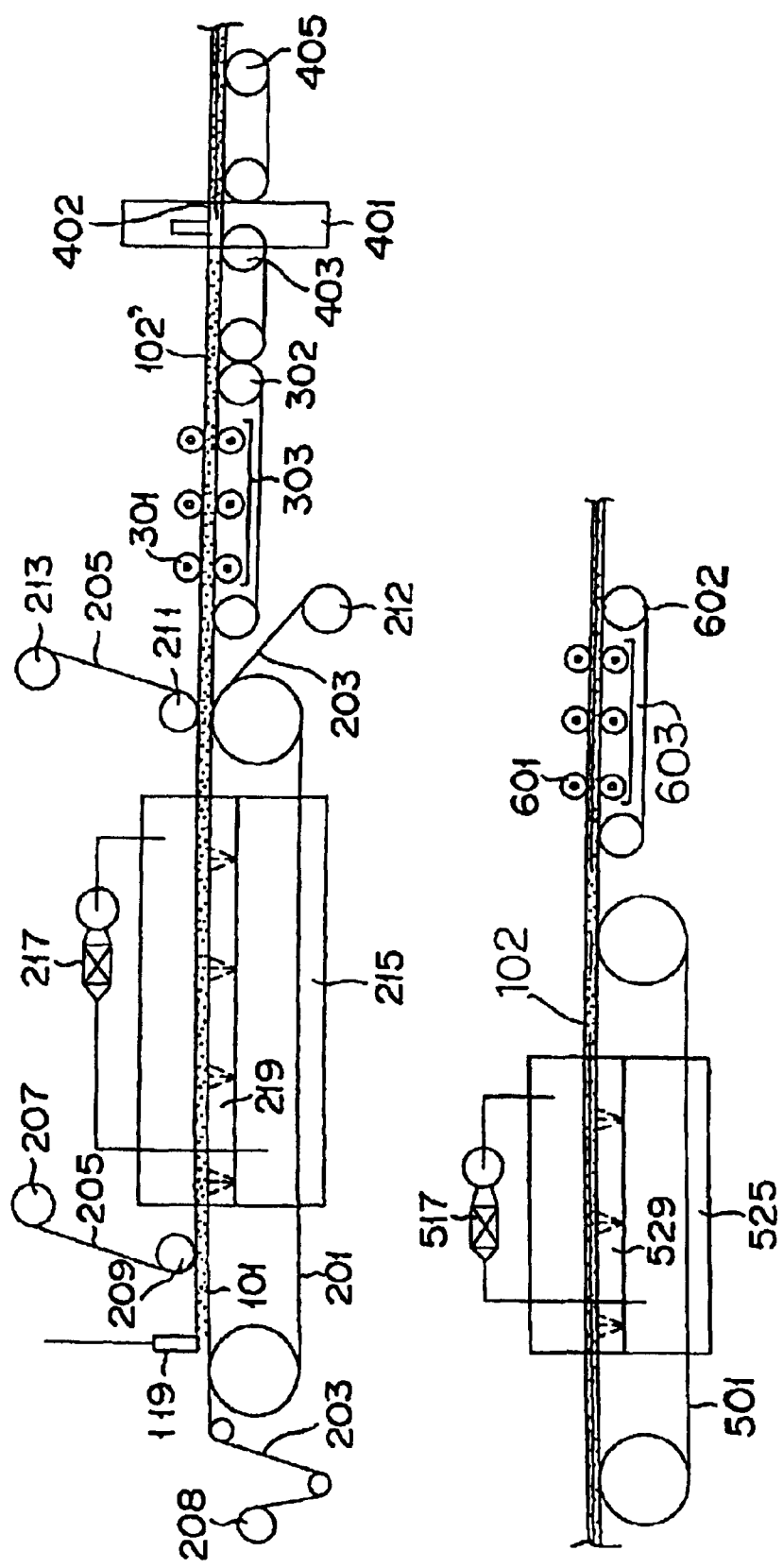
FIG. 2 is a schematic side view illustrating a typical working example of the continuous polymerization device, inclusive of a latter-stage polymerization, which is suitable in the method of this invention for the production of a porous cross-linked polymer.

FIG. 2 depicts a mode of embodiment which comprises dehydrating with a dehydrating device 303 a porous cross-linked former-stage polymer 102 obtained by subjecting an HIPE 101 to former-stage polymerization, slicing the polymer with the endless band knife type slicer 401, conveying the sliced pieces with an endless belt type conveyor 501 to a latter-stage polymerizing furnace 525 which is provided with a heating means 517 formed of hot air circulating devices and a heating means 529 formed of hot water showers and disposed under the conveyor belt 501, and completing polymerization with a latter-stage polymerization. It illustrates the case of continuing the transfer with a conveyor 602 and further repeating the dehydration with a dehydrating device 603 after the step of slicing.

This invention, as outlined above, is characterized by dehydrating the porous cross-linked polymer before the polymer is sliced. Heretofore, it has been customary to form and polymerize an HIPE and consequently obtain a porous cross-linked polymer, then slice the polymer, and thereafter dehydrate the sliced polymer as occasion demands. The slicing treatment, however, cannot be attained smoothly because the porous cross-linked polymer adheres to the guide faces fulfilling the function of repressing the vertical vibration of the band knife during the course of the slicing and transferring the sliced porous cross-linked polymer and the porous cross-linked polymer consequently sustains a fold or a crack. A detailed investigation conducted on this detriment in search of the cause therefore has formed a conclusion that the cut faces inserted in the porous cross-linked polymer by the slicing are liable to adhere to the guides by virtue of the capillary phenomenon of water possibly to the extent of rendering release of the sliced faces from the guides difficult. It is also inferred that since the porous cross-linked polymer itself has a heavy weight and the mechanical strength of the polymer rated by tension fracture is small, when the porous cross-linked polymer which has been made to adhere fast to the guides by the capillary phenomenon after the step of slicing is separated from the guides and is further exposed to tension for the sake of conveyance, the porous cross-linked polymer is caused by the tension, if very slight, to sustain a fold or a crack.

This invention, by expelling the water initially contained in the polymer by the dehydration prior to the slicing thereby enervating the capillary phenomenon, decreasing the adhesion of the polymer to the guides, and lightening the weight of the polymer, enables the porous cross-linked polymer to be prevented from sustaining a fold and a crack even when the polymer is exposed to the tension necessary for the transportation. Moreover, the fact that the sliced porous cross-linked polymer can be conveyed by optionally exerting the necessary tension thereto serves the purpose of adding to the slicing speed. Further, since the salt contained in advance in the porous cross-linked polymer can be removed prior to the step of slicing, the possibility of the slicer gathering rust and inducing adhesion of rust to the porous cross-linked polymer can be repressed. Now, this invention will be described in detail below.

[I] Formation and Polymerization of HIPE (1) Raw Material to be Used for HIPE

The raw material to be used for the HIPE has only to contain (a) a polymerizable monomer, (b) a cross-linking monomer, and (c) a surfactant as essential components for forming an oil phase and to contain (d) water as an essential component for forming a water phase. As occasion demands, it may further contain (e) a polymerization initiator, (f) a salt, and (g) other additives as arbitrary components for forming the oil phase and/or the water phase.

(a) Polymerizable Monomer

The polymerizable monomer mentioned above does not need to be particularly restricted but has only to possess one polymerizable unsaturated group in the molecular unit and to be capable of polymerizing in an HIPE and forming bubbles. It contains preferably at least partly a (meth)acrylic ester, more preferably not less than 20% by weight of the (meth)acrylic ester, and particularly preferably not less than 35% by weight of the (meth)acrylic ester based on the total weight of the HIPE. The inclusion of the (meth)acrylic ester as a polymerizable monomer in the raw material proves preferable because it allows production of a porous material abounding in plasticity and toughness.

As concrete examples of the polymerizable monomer, allylene monomers such as styrene; monoalkylene allylene monomers such as ethyl styrene, α-methyl styrene, vinyl toluene, and vinylethyl benzene; (meth)acrylic esters such as methyl (meth)acrylate, ethyl (meth)acrylate, butyl (meth) acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidne chloride, and chloromethyl styrene; acrylonitrile compounds such as acrylonitrile and methacrylonitrile; and vinyl acetate, vinyl propionate, N-ocetadecyl acrylamide, ethylene, propylene, and butene may be cited. These polymerizable monomers may be used either singly or in the form of a combination of two or more members.

The quantity of the polymerizable monomer to be used is preferred to be in the range of 10–99.9% by weight based on the total weight of the monomer component formed of the polymerizable monomer and a cross-linking monomer which will be specifically described herein below. The reason for the preference of this range is that the porous material to be produced acquires a fine pore diameter. This range is more preferably 30–99% by weight and particularly preferably 30–70% by weight. If the quantity of the polymerizable monomer to be used falls short of 10% by weight, the shortage will possibly suffer the produced porous material to become brittle and reveal deficiency in the ratio of cubic expansion with absorbed water. Conversely, if the quantity of the polymerizable monomer exceeds 99.9% by weight, the excess will possibly induce the produced porous material to reveal deficiency in strength and resilient recovery and to fail to absorb water in a sufficient quantity and secure a sufficient speed of water absorption.

(b) Cross-Linking Monomer

The cross-linking monomer does not need to be particularly restricted but has only to possess at least two polymerizable unsaturated groups in the molecular unit thereof and, similarly to the polymerizable monomer mentioned above, to be capable of dispersing or polymerizing in the HIPE.

As concrete examples of the cross-linking monomer, aromatic monomers such as divinyl benzene, trivinyl benzene, divinyl toluene, divinyl xylene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as diviyl sulfide and divinyl sulfone; aliphatic monomers such as butadiene, isoprene, and pentadiene; and ester compounds of polyhydric alcohols and acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, and N,N'-methylene bis(meth)acrylamide, triallyl isocyanurate, triallyl amine, tetraallyloxyethane, and hydroquinone, catechol, resorcinol, and sorbitol may be cited. These cross-linking monomers may be used either singly or in the form of a combination of two or more members.

The quantity of this cross-linking monomer to be used is preferably in the range of 0.1–90% by weight, more preferably in the range of 1–70% by weight, and particularly preferably in the range of 30–70% by weight based on the total weight of the monomer component formed of the polymerizable monomer and the cross-linking monomer. If the quantity of the cross-linking monomer to be used falls short of 0.1% by weight, the shortage will possibly induce the produced porous material to reveal deficiency in strength and resilient recovery and in capacity for absorption per unit volume or unit weight and fail to absorb water in a sufficient quantity and secure a sufficient speed of water absorption. Conversely, if the quantity of the cross-linking monomer to be used exceeds 90% by weight, the excess will possibly induce the porous material to become brittle or reveal deficiency in the ratio of cubic expansion with absorbed water.

(c) Surfactant

The surfactant mentioned above does not need to be particularly restricted so long as it is capable of emulsifying the water phase in the oil phase in the configuration of the HIPE. It may be properly selected from the nonionic surfactants, cationic surfactants, anionic surfactants, and amphoteric surfactants which have been known to the art.

The nonionic surfactants include nonylphenol polyethylene oxide adduct; block polymer of ethylene oxide and propylene oxide; sorbitan fatty acid esters such as sorbitan monolaurate, sorbitan monomyristirate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonylphenol ether; polyoxyethylene sorbitan fatty acid esters such as polyoxyethylene sorbitan monolaurate, polyoxyethylene sorbitan myristylate, polyoxyethylene sorbitan monopalmitate, polyoxyethylene sorbitan monostearate, polyoxyethylene sorbitan tristearate, polyoxyethylene soribitan monooleate, and polyoxyethylene sorbitan trioleate; polyoxyethylene sorbitol fatty acid esters such as tetraoleinic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines, polyoxyethylene-hardened castor oil; and alkylalkanol amides, for example. These nonionic surfactants particularly have a HLB not more than 10, preferably a HLB falling in the range of 2–6. These nonionic surfactants may be used in the form of a combination of two or more members. This combined use possibly improves the HIPE in stability.

The cationic surfactants include quaternary ammonium salts such as stearyltrimethyl ammonium chloride, ditaulo dimethyl ammonium methyl sulfate, cetyltrimethyl ammonium chloride, distearyldimethyl ammonium chloride, alkylbenzylimethyl ammonium chlorides, and lauryltrimethyl ammonium chloride; alkyl amine salts such as coconut amine acetate and stearyl amine acetate; alkyl betaines such as lauryl betaine, stearyl betaine, and lauryl carboxymethyl hydroxyethyl imidazolinium betaine; and amine oxides such as lauryldimethyl amine oxide, for example. The use of such a cationic surfactant possibly imparts an outstanding antibacterial property to the produced porous material when this material is utilized as water absorbent, for example.

The anionic surfactants which are possessed of an anionic moiety and an oil-soluble moiety can be advantageously used. They include alkyl sulfates such as sodium dodecyl sulfate, potassium dodecyl sulfate, and ammonium alkyl sulfates; sodium dodecylpolyglycol ether sulfate; sodium sulforicinoleate; alkyl sulfonates such as sulfonated paraffin salt; alkyl sulfonates such as sodium dodecylbenzene sulfonate and alkali metal sulfates of alkaliphenol hydroxyethylene; higher alkyl naphthalene sulfonates; fatty acid salts such as naphthalene sulfonic acid formalin condensate, sodium laurate, triethanol amine oleate, and triethanol amine apiate; sulfuric ester of polyoxyalkyl ether; sulfuric esters of polyoxyethylene carboxylic acid; sulfuric esters of polyoxyethylene phenyl ether; sulfonic acid salts of succinic dialkyl esters; and reactive anionic emulsifierfs possessed of a double bond such as polyoxyethylene alkyl aryl sulfates, for example. Such an anionic surfactant may be used in combination with a cationic surfactant in order to prepare the HIPE.

Incidentally, the combined use of a nonionic surfactant and a cationic surfactant possibly improves the HIPE in stability.

The quantity of the surfactant mentioned above to be used is preferably in the range of 1–30 parts by weight, more preferably in the range of 3–15 parts by weight, based on 100 parts by weight of the total weight of the monomer component formed of a polymerizable monomer and a cross-linking monomer. If the quantity of the surfactant to be used falls short of 1 part by weight, the shortage will possibly render the high dispersibility of the HIPE unstable and prevent the surfactant itself from manifesting fully satisfactorily the function and effect inherent therein. Conversely, if the quantity of the surfactant to be used exceeds 30 parts by weight, the excess will possibly induce the produced porous material to become unduly brittle and prove uneconomical because it fails to bring a proportionate addition to the expected effect.

(d) Water

As the water mentioned above, besides tap water, purified water, and deionized water which are available, the waste water resulting from the production of a porous cross-linked material may be used either directly in its unmodified form or after undergoing a prescribed treatment with the aim of promoting the waste product recovery.

The quantity of the water to be used may be properly selected, depending on the purpose of use of a porous cross-linked polymer possessed of continuous cells (such as, for example, a water absorbent, an oil absorbent, a sound insulator, or a filter). Specifically, since the ratio of holes of a porous cross-linked polymer is decided by varying the water phase/oil phase (W/O) ratio of a given HIPE, the quantity of the water to be used is automatically decided by selecting such a W/O ratio as to obtain a ratio of holes conforming to the purpose of use.

(e) Polymerization Initiator

For the purpose of attaining the polymerization of the HIPE in a very short duration as aimed at by this invention, it is preferable to use a polymerization initiator. This polymerization initiator has only to be usable in the reversed-phase emulsion polymerization. It may be either soluble in water or soluble in oil.

As concrete examples of the water-soluble polymerization initiator, azo compounds such as 2,2-azobis(2-amidinopropane)dihydrochloride; persulfates such as ammoniumpersulfate, potassiumpersulfate, and sodium persulfate; and peroxides such as potassium peracetate, sodium peracetate, potassium percarbonate, and sodium percarbonate may be cited.

As concrete examples of the oil-soluble polymerization initiator, peroxides such as cumene hydroperoxide, t-butyl hydroperoxide, t-butylperoxy-2-ethylhexanoate, di-t-butyl perxodie, diisopropyl benzene peroxide, p-menthane hydroperoxide, 1,1,3,3-tetramethyl butyl hydroperoxide, 2,5-dimethylhexanone-2,5-dihydroperoxide, benzoyl peroxide, and methylethyl ketone peroxide may be cited. These polymerization initiators may be used either singly or in the form of a combination of two or more members. It is preferable to use in combination two or more polymerization initiators which have different 10-hour half-life temperatures, i.e. the temperatures at which the concentration is halved in 10 hours. As a matter of fact, a water-soluble polymerization initiator and an oil-soluble polymerization initiator may be used in combination.

The quantity of the polymerization initiator which can be used for the reversed-phase emulsion polymerization mentioned above is preferably in the range of 0.05–25 parts by weight, more preferably in the range of 1.0–10 parts by weight, based on 100 parts by weight of the total weight of the monomer component formed of a polymerizable monomer and a cross-linking monomer, though variable with the combination of the monomer component and the polymerization initiator mentioned above. If the quantity of the polymerization initiator to be used falls short of 0.05 part by weight, the shortage will be at a disadvantage in unduly increasing the unaltered monomer component and consequently adding to the quantity of the residual monomer in the produced porous material. Conversely, if the quantity of the polymerization initiator to be used exceeds 25 parts by weight, the excess will be at a disadvantage in rendering the control of polymerization difficult and inducing the produced porous material to suffer from degradation of mechanical properties.

It is further permissible to use a redox polymerization initiator which is obtained by combining the polymerization initiator mentioned above with a reducing agent. In this case, the polymerization initiator may be either in a water-soluble type or in an oil-soluble type optionally, a water-soluble redox polymerization initiator and an oil-soluble redox polymerization initiator may be used in combination.

As concrete examples of the water-soluble reducing agents among other reducing agents mentioned above, sodium hydrogen sulfite, potassium hydrogen sulfite, sodium thiosulfate, potassium thiosulfate, L-ascorbic acid, ferrous aalts, formaldehyde sodium sulfoxylate, glucose, dextrose, triethanol amine, and diethanol amine may be cited. As concrete examples of the oil-soluble reducing agents, dimethyl aniline, tin octylate, and cobalt naphthenate may be cited. These reducing agents for the redox polymerization initiators may be used either singly or in the form of a combination of two or more members.

The ratio of the reducing agent (ratio by weight) contained in the redox polymerization initiator mentioned above, i.e. polymerization initiator (oxidizing agent)/reducing agent, is approximately in the range of 1/0.01–1/10, preferably in the range of 1/0.2–1/5.

Incidentally, the polymerization initiator (inclusive of the redox type polymerization initiator) is only required to be present at least during the polymerization of the HIPE. As described more specifically herein below, ① it may be added to the oil phase and/or the water phase in advance of the formation of the HIPE, ② it may be added at the same time that the HIPE is formed, or ③ it may be added after the HIPE has been formed. Further, in the case of the redox polymerization initiator, the polymerization initiator (oxidizing agent) and the reducing agent may be added at different times.

(f) Salt

The salt mentioned above may be used when it is required to improve the HIPE in stability.

As concrete examples of the salt, halogenides, sulfates, and nitrates and other water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added to the water phase. Polyvalent metal salts prove particularly advantageous from the viewpoint of the stability of the HIPE during the course of polymerization.

The quantity of the salt to be used is preferably in the range of 0.1–20 parts by weight and more preferably in the range of 0.5–10 parts by weight, based on 100 parts by weight of water. If the quantity of the salt to be used exceeds 20 parts by weight, since the waste water squeezed out of the HIPE is fated to contain the salt in an unduly large quantity, the excess will increase the cost for the treatment of waste water and prove uneconomical because it brings no proportionate addition to the expected effect of addition. If the quantity of the salt to be used falls short of 0.1 part by weight, the shortage will possibly prevent the function and effect of the addition of the salt from being manifested fully satisfactorily.

(g) Other Additive

Other various additives may be properly used when the impartation of the performances and functions of their own result in improving the production condition, the characteristic properties of a produced HIPE, and the performance of a porous cross-linked polymer. A salt and/or a buffer may be added, for example, for the purpose of adjusting the pH. The quantities of such other additives to be used have only to fall in ranges such that the performances, functions, and economies commensurate with the purposes of addition of their own may be manifested fully satisfactorily. As concrete examples of the additives, activated carbon, inorganic powder, organic powder, metal powder, deodorant, antibacterial agent, mildewproofing agent, perfume, and various macromolecular substances may be cited.

(2) Method for Preparation of HIPE

The method for the formation of the HIPE which can be used in this invention does not need to be particularly restricted. Any of the heretofore known methods for the preparation of the HIPE may be properly used. Now, a typical method for the preparation of the HIPE will be specifically described below.

First, such components as a polymerizable monomer, a cross-linking monomer, and a surfactant, an optionally usable oil-soluble polymerization initiator (inclusive of an oil-soluble redox polymerization initiator) and other additives which together form an oil phase are supplied in respectively specified quantities of usage and stirred at a prescribed temperature to prepare a homogeneous oil phase.

Separately, such components as water and optionally usable water-soluble polymerization initiator (inclusive of a water-soluble redox polymerization initiator), salt, and other additives which together form a water phase are supplied in respectively specified quantities of usage, stirred, and heated at a prescribed temperature in the range of 30–95° C. to prepare a homogeneous water phase.

Then, the oil phase, i.e. the mixture of the monomer component and the surfactant, and the water phase, i.e. the mixture of the water and the water-soluble salt, which are prepared as mentioned above are joined, mixed and stirred efficiently at the HIPE-forming temperature (emulsifying temperature) which will be specifically described herein below under a moderate shear force till they are emulsified. Consequently, the HIPE is stably prepared. As a way of stirring and mixing the water phase and the oil phase particularly for stably preparing the HIPE, the method which comprises keeping the oil phase in a stirred state and continuously adding the water phase to the stirred oil phase over a period of several minutes to some tens of minutes proves advantageous. Optionally, the HIPE may be produced by stirring and mixing part of the water-phase component with the oil-phase component till formation of the HIPE resembling yogurt and subsequently adding the remainder of the water-phase component to the resultant mixture and continuously stirring and mixing them.

(3) Water Phase/Oil Phase (W/O) Ratio

The water phase/oil phase (W/O) ratio in the HIPE obtained as described above does not need to be particularly restricted but may be properly selected, depending on the purpose for which the porous material possessed of continuous cells is used (such as, for example, water absorbent, oil absorbent, sound absorbent, or filter). It has only to exceed 3/1 as defined previously. This ratio is preferably in the range of 10/1–250/1 and particularly preferably in the range of 10/1–80/1. If the W/O ratio falls short of 3/1, the shortage will compel the porous cross-linked polymer to reveal deficiency in the ability to absorb water and energy and to suffer an unduly low aperture and will open the possibility of the produced porous cross-linked polymer revealing deficiency in the surface aperture and failing to acquire a fully satisfactory ability to pass liquid. By varying the W/O ratio, however, it is made possible to decide the ratio of holes of the porous cross-linked polymer. It is, therefore, preferable to select the W/O ratio so that the hole ratio may conform to the purpose of use. When the porous cross-linked polymer is used as a varying absorbent material for disposable diapers and sanitary articles, for example, the W/O ratio is preferred to fall approximately in the range of 10/1–80/1. Incidentally, the HIPE which is obtained by stirring and mixing the water phase and the oil phase is generally a white highly viscous emulsion.

(4) Apparatus for Production of HIPE

The apparatus for the production of the HIPE mentioned above does not need to be particularly restricted but may be selected from among the heretofore known apparatuses available for the production of HIPE. As the stirring device (emulsifying device) to be used for stirring the water phase and the oil phase till thorough mixture, a known stirring device or kneading device may be adopted. As concrete examples of the stirring device, stirring devices possessed of such a pinnate member as a propeller, a paddle, or a turbine, homomixers, line mixers, and pin mills may be cited. Any of such stirring devices will suffice.

(5) Emulsifying Temperature for HIPE

The emulsifying temperature for the HIPE is generally in the range of 20–100° C. From the viewpoint of the stability of the HIPE, it is preferably in the range of 30–95° C., more preferably in the range of 40–95° C., particularly preferably in the range of 40–85° C., and most preferably in the range of 55–70° C. If the emulsifying temperature for the HIPE falls short of 20° C., the shortage will open the possibility of requiring the heating to continue for an unduly long time, depending on the polymerizing temperature. Conversely, if the emulsifying temperature for the HIPE exceeds 100° C., the excess will open the possibility of degrading the stability of the formed HIPE. Incidentally, the procedure which comprises preparatory adjusting the temperature of the oil phase and/or the water phase at a prescribed emulsifying temperature and stirring and mixing the two phases till they are emulsified enough to form an HIPE as expected proves advantageous. In the preparation of an HIPE, however, since the quantity of the water phase is large, it may well be rated proper to have the temperature of at least the water phase adjusted in advance to the prescribed emulsifying temperature. When the polymerizable monomer and the cross-linking monomer begin to polymerize and form a polymer while the emulsification is in process, the HIPE will possibly be rendered unstable. When the polymerization initiator (inclusive of the redox polymerization initiator) is included in the raw material for the preparation of the HIPE, therefore, the emulsifying temperature for the HIPE is preferred to be set at a temperature at which the polymerization initiator (oxidizing agent) substantially initiates thermal decomposition and the polymerization of the HIPE is consequently prevented from starting. It is, therefore, preferable for the emulsifying temperature to be lower than the temperature at which the half life of the polymerization initiator (oxidizing agent) is 10 hours (10-hour half-life temperature).

(6) Formation of HIPE

The HIPE prepared as described above is formed in an expected shape before the polymerizable monomer component in the HIPE begins to polymerize. This invention effects this formation by supplying the HIPE by the batch method or the continuous method. The term "continous method" as used in the present specification refers to a procedure which comprises continuously supplying the HIPE obtained as described above to a forming device, then continuously polymerizing it in a polymerizing device, and subsequently dehydrating and sliding the resultant polymer and the term "batch method" refers to a procedure which comprises pouring the produced HIPE into a vessel having a prescribed shape or imparting a prescribed shape to the HIPE, polymerizing the HIPE packed in a vessel or collecting a proper number of shaped pieces of the HIPE and polymerizing them together, optionally cutting the polymerized HIPE into pieces of a thickness proper for dehydration, and subsequently dehydrating and slicing the cut pieces of the polymerized HIPE.

Since the continuous method which consists in continuously forming and polymerizing the HIPE has high productivity and permits the polymerized HIPE to be continuously dehydrated and sliced, it is at an advantage in enabling the effect of the method of this invention in curtailing the slicing time to be utilized most effectively. To be specific, the method for continuous production of a porous cross-linked polymer sheet comprises continuously supplying the HIPE onto the advancing belt of a belt conveyor so constructed as to heat the surface of the belt with a heating device and meantime forming the HIPE on the belt in the shape of a smooth sheet. When the surface of the conveyor used for contacting the emulsion is smooth and the HIPE is supplied in a prescribed thickness onto the belt, this HIPE is enabled to form a continuous sheet having an expected thickness.

For the purpose of producing the porous cross-linked polymer in a three-dimensional shape, the method of casting polymerization which consists in pouring the HIPE in a female die of that shape and polymerizing the HIPE in the die may be adopted. Incidentally, the cast polymerization may be performed batchwise as described above or continuously by causing such dies to travel successively.

The HIPE is preferred to be sealed with a film of PET, for example, lest the surface of the HIPE should be exposed to the ambient air. The surface of the HIPE exposed to the air is no longer capable of retaining the porosity of the HIPE and the produced porous cross-linked polymer is possibly deficient in water absorbing properties. The seal is broken after the polymerization of the HIPE is completed.

(7) Polymerization of HIPE (a) Time for Adding Polymerization Initiator

The HIPE begins to polymerize in consequence of the addition of a polymerization initiator and the application of heat. The polymerization initiator is ① added to and mixed with the water phase and/or the oil phase prior to the formation of the HIPE, ② added at the same time that the HIPE is formed, or ③ added after the HIPE has been formed. In the case of the addition of ②, the redox polymerization initiator may be used instead similarly to the case of ① described in the paragraph dealing with the method for the formation of the HIPE.

In this case, the method of having the polymerization initiator or the reducing agent added preparatory to the oil phase when the agent is soluble in oil or to the water phase when the agent is soluble in water proves convenient. Further, the method which comprises adding the emulsified product of the oil-soluble polymerization initiator (oxidizing agent) or reducing agent to the water phase may be cited. The polymerization initiator may be used in an undiluted form or in the form of a solution or dispersion in water or an organic solvent. When the polymerization initiator is added at the same time that the HIPE is formed or after the HIPE has been formed, it is important that the added polymerization initiator should be quickly and uniformly mixed with the HIPE for the purpose of preventing the monomer component from polymerizing unevenly.

The HIPE which has the polymerization initiator mixed therewith is quickly introduced into such an apparatus for polymerization as a polymerizing vessel or a continuous polymerizing device. The practice of providing the path extending from the emulsifier preparing the HIPE through the polymerizing vessel or continuous polymerizing device with an inlet port for a reducing agent or an oxidizing agent or polymerization initiator, adding the HIPE through this inlet port, and mixing the components in the path with a line mixer is recommended.

(b) Polymerizing Temperature and Polymerizing Time

The temperature for polymerizing the HIPE is generally in the range of normal room temperature—150° C. From the viewpoint of the stability of the HIPE and the speed of polymerization, the range is preferably 60–120° C., more preferably 75–110° C., and particularly preferably 85–110° C. If the polymerizing temperature falls short of normal room temperature, the shortage will suffer the polymerization to require an unduly long time and possibly prove unfavorable for commercial production. Conversely, if the polymerizing temperature exceeds 150° C., the excess will be at a disadvantage in suffering the produced porous cross-linked polymer to acquire an uneven pore diameter and to reveal deficiency in strength. The polymerizing temperature may be changed in two steps or more steps during the course of the polymerization. The present invention does not exclude this mode of effecting the polymerization.

The polymerizing time for the HIPE is generally in the range of one minute—20 hours. The range is preferably with in one hour, more preferably within 30 minutes, and particularly preferably 1–20 minutes. If the polymerizing time exceeds 20 hours, the excess will possibly prove commercially unfavorable because of the deficiency in productivity. Conversely, if it falls short of one minutes, the shortage will possibly suffer the produced porous cross-linked polymer to be deficient in strength. Naturally, this invention does not exclude the adoption of a longer polymerizing time than the upper limit of the range specified above.

Incidentally, the polymer finally obtained is cooled naturally or gradually to a prescribed level, though not exclusively. The porous cross-linked polymer obtained by the polymerization may be shifted to such steps of after treatment as dehydration, slicing, washing, and compression which will be specifically described herein below without being cooled in advance.

When the porous cross-linked polymer retains such a mechanical strength as to withstand the impacts of the dehydrating and slicing operations, the polymerizable monomer and the cross-linking monomer contained in the HIPE are not required to have completed polymerization and cross-linkage. The polymerization is required to have advanced to such an extent that the whole monomer composed of a polymerizable monomer and a cross-linking monomer and contained in the HIPE may exhibit a bromine value in the approximate range of 25–10% of the value existing prior to the polymerization. From this point of view, the term "former-stage polymerization" as used in the present specification ought to be construed as referring to the increase of the bromine value of the whole monomer contained in the HIPE determined by the method reported in the working example which will be cited herein below to a level in the range of 25–10% of the bromine value existing prior to the polymerization. The former-stage polymerization refers to the stage of polymerization and cross-linkage in which the porous cross-linked polymer forms its skeleton in consequence of the polymerization and cross-linkage of the polymerizable monomer and the cross-linking monomer. When the former-stage polymerization has been carried out, the polymerization and the cross-linkage advancing therein can be completed by dehydrating the porous cross-lkined former-stage polymer obtained by the former-stage polymerization, then sliding it, and thereafter either heating it to a temperature higher than the former-stage polymerizing temperature or exposing it to an activated energy ray thereby performing latter-stage polymerization till the bromine value reaches a level in the range of 15%–0%, preferably in the range of 10–5%, of the bromine value existing prior to the polymerization. From this point of view, the term "latter-stage polymerization" as used in the present specification ought to be construed as referring to the polymerization performed till the bromine value of the whole monomer reaches 15% of the bromine value existing prior to the polymerization. The bromine value of the porous cross-linked polymer resulting from the completion of the polymerization of the HIPE generally refers to a level falling in the range of 15%–0%, preferably in the range of 10–5%, of the bromine value existing prior to the polymerization.

In the present invention, the polymerization of the HIPE may be carried out as split into a former-stage polymerization and a latter-stage polymerization, with a step of dehydration or a step of slicing interposed between the two stages of polymerization. Otherwise, the dehydration and the slicing may be performed after the polymerization of the HIPE has been completed without being split into the two stages mentioned above. The former-stage polymerization may be carried out under the same polymerizing conditions as when the polymerization of the HIPE is completed at once. The temperature for the latter-stage polymerization is generally in the range of 60–170° C. From the viewpoint of the polymerizing time, the temperature is preferably in the range of 80–160° C., more preferably in the range of 95–160° C., and particularly preferably in the range of 110–150° C. If the temperature for the latter-stage polymerization falls short of 60° C., the shortage will suffer the polymerization and the cross-linkage in the latter-stage polymerization to require an unduly long time till completion and will possibly prove unfavorable commercially. Conversely, if this temperature exceeds 170° C., the excess will be at a disadvantage in requiring an unduly long time till the temperature is elevated to the temperature for the latter-stage polymerization. The temperature of the latter-stage polymerization may be varied into two or more stages.

(c) Apparatus for Polymerization

The apparatus for polymerization which can be used in this invention does not need to be particularly restricted. A belt conveyor type continuous polymerizing device provided with a temperature adjusting device or a continuous casting polymerizing device may be used, for example. In the method which consists in continuously forming and polymerizing the HIPE as described in the paragraph dealing with the formation of HIPE, the apparatus operated by a procedure which comprises continuously supplying the HIPE onto the advancing belt of a belt conveyor so constructed as to heat the surface of the belt with a heating device and meantime forming the HIPE on the belt in the shape of a smooth sheet is available, for example. Naturally, the continuous method allows use of a batch polymerizing column or a batch casting type polymerizing device.

When the polymerization of the HIPE is carried out in the batch mode, the HIPE is introduced into a cylindrical polymerizing vessel and the polymerizing vessel is heated from the outer side. For the purpose of obtaining the porous cross-linked polymer in the form of a sheet, however, the porous cross-linked polymer produced in a cylindrical form is cut out in a prescribed thickness as with the heretofore known peeling machine to obtain a continuous sheet in advance.

(d) Thickness of Porous Cross-Inked Polymer

This invention imposes no particular restriction on the thickness of the porous cross-linked polymer or porous former-stage polymer which is ready to undergo dehydration. It is, however, preferably not more than 100 mm, more preferably in the range of 0.5–50 mm, and particularly preferably in the range of 0.5–30 mm. Even when the porous cross-linked polymer is produced by polymerizing the HIPE in the batch mode, therefore, it is preferable to have this polymer sliced in a thickness of not more than 100 mm with the peeling machine. If the thickness exceeds 100 mm, the excess will open the possibility of the polymer being unevenly dehydrated at the subsequent step of dehydration, failing in such a case to acquire an even water content in the direction of thickness, and sustaining breakage at the step of dehydration.

[II] Dehydration of Porous Cross-Linked Polymer (a) Water Content

This invention is characterized by weakening the capillary phenomenon caused by the water contained in the sliced faces of the porous cross-linked polymer by effecting the removal of the initially contained water prior to the step of slicing, enabling the porous cross-linked polymer to withstand exertion thereon of tension necessary during the course of conveyance by rendering the sliced faces difficult to adhere to the guides, lightening the weight of the sliced porous cross-linked polymer, and allowing the initial water content of the porous cross-linked polymer to be lowered to a prescribed level by attaining an increase in the slicing speed, effecting the removal of the salt contained in the porous cross-linked polymer prior to the step of slicing, and retaining the generation of rust and the adhesion of rust during the course of the slicing.

As one standard for determining the water content of the porous cross-linked polymer, the question whether the dehydrated porous cross-linked polymer withstands the impact of the slicing action and retains the mechanical strength enough to tolerate the impact of the conveyance serves the function of a clue to the determination. The water content for obtaining necessary mechanical strength is preferred to be set depending on the initial water content of the porous cross-linked polymer. Incidentally, the initial water content designates the water content possessed by the polymerized HIPE and is expressed by the W/O ratio. The mechanical strength of the porous cross-linked polymer under discussion here is affected by such factors as, for example, the glass transition point (Tg), the molecular weight (MW), and the pore diameter. The relations between the quantity of the initially contained water on one part and the water content, the ratio of dehydration, and the tension fracture on the other part generally embrace the relation between the value of initial water content due to the difference in the W/O ratio and the water content and the ratio of dehydration proper for the treatments of dehydration and slicing as shown in Table 1 and the relation between the specific W/O ratio on one part and the water content, the ratio of dehydration, and the tension fracture in the region allowing determination of the tension fracture on the other part as shown in Table 2. It is provided, however, that when the W/O ratio is 13/1, the water content in the dry state is indicated to be 30% and that when this water content is adjusted to a level of 400 w/w % as in the case of the ratio of dehydration allowing determination of tension fracture, namely the removal of 69 w/w % of the initial water content, the tension fracture is indicated to be 550 g/cm as shown in Table 2. These numerical values are simply meant to adduce one example.

TABLE 1

| Upper row: W/O ratio Lower row: Initial water content | Preferable water content (w/w %) | Preferable ratio of dehydration (w/w %) |
|---|---|---|
| 10/1–30/1 | 100–1500 | 50–90 |
| 1000–3000 w/w % | | |
| 30/1–80/1 | 200–4000 | 50–94 |
| 3000–8000 w/w % | | |
| 80/1–250/1 | 500–5000 | 80–94 |
| 8000–25000 w/w % | | |

TABLE 2

| W/O | Water content allowing determination of tension fracture (w/w %) | Ratio of dehydration allowing determination of tension fracture (w/w %) | Tension fracture (g/cm) |
|---|---|---|---|
| 13/1 | (Dry state: 30) | (Dry state: 92) | (Dry state: 600) |
| | 400 | 69 | 550 |
| | 600 | 54 | 400 |
| 48/1 | (Dry state: 30) | (Dry state: 98) | (Dry state: 500) |
| | 500 | 90 | 450 |
| | 1000 | 79 | 200 |
| | 2000 | 58 | 100 |
| 65/1 | (Dry state: 30) | (Dry state: 98) | (Dry state: 150) |
| | 500 | 92 | 100 |
| | 1000 | 85 | 50 |
| | 2000 | 69 | 30 |

The tension fracture reported in Table 2 was determined under the following conditions. To test a given material for tensile strength, a test piece measuring 20 mm×70 mm was prepared and used to determine the tension fracture by using the central part, 50 mm in length, thereof as a span, stretching the opposite ends of the test piece each at a cross head speed of 10 mm/min., and finding the tension that induced the test piece to fracture.

As is clear from Table 1, not less than 50%, preferably 60–90%, and particularly preferably 70–90% of the initial water content of the porous cross-linked polymer is dehydrated when the initial water content of the polymer is in the range of 1000–3000 w/w %. Then, not less than 50%, preferably 60–94%, and particularly preferably 70–94% of the initial water content is dehydrated when the initial water content is in the range of 3000–8000 w/w %. Not less than 80%, preferably 85–94%, and particularly preferably 90–94% of the initial water content is dehydrated when the initial water content is in the range of 8000–25000 w/w %. It is provided, however, that when the initial water content is not less than 8000 w/w % (W/O=80/1), since the mechanical strength of the porous cross-linked polymer obtained by impartation of shape and polymerization is weak, the speed of dehydration cannot be increased and the action of sliding cannot be accomplished unless the ratio of dehydration is raised above 80%. When the porous cross-linked polymer is used as varying absorbents in disposable diapers and sanitary articles, therefore, the initial water content (W/O ratio) is generally preferable to be in the range of 10/1–80/1 (initial water content 1000–8000 w/w %).

It is also clear from Table 2 that the relation between the water content and the tension fracture is affected so greatly by the initial water content that the thickness of the bubbled wall of the produced porous cross-linked polymer decreases in accordance as the initial water content increases. In various cases of changing the W/O ratio, therefore, when the water contents of varying samples are is decreased by dehydration and desiccation to about 30% and the samples in the resultant dry state are compared, the samples show an inclination of decreasing the tension fracture in accordance as the initial water content of porous cross-linked polymer (W/O ratio)increases. By the same to ken, the tension fracture tends to increase in accordance as the ratio of dehydration of the porous cross-linked polymer increases (namely, in proportion as the water content decreases). Incidentally, a test piece having a water content of not less than 2000 w/w % failed to allow determination of tension fracture because the portions thereof nipped between the vertically opposed chucks during the course of the tensile test tended to break.

(b) Dehydration

This invention does not need to impose any restriction on the method for dehydration but only requires the method to be capable of dehydrating a porous cross-linked polymer. The treatment for such dehydration can be carried out by any of the known methods which are usable at all for the dehydration of a porous cross-linked polymer. Thus, the porous cross-linked polymer obtained in consequence of formation and polymerization may be dehydrated by centrifugal force, by immersion in a volatile solvent, or by suction under a vacuum, or by the combination thereof. The compressing operation which consists in nipping a given porous cross-linked polymer between a plurality of pairs of dehydrating rolls, however, prove advantageous because it can continuously dehydrate the porous cross-linked polymer and further can continuously slice the dehydrated porous cross-linked polymer. As one example of the continuous method of this operating principle, the method which consists in rotating dehydrating rolls each furnished with a suction mechanism on and beneath a porous cross-linked polymer formed in consequence of polymerization, compressing the polymer between the opposed dehydrating rolls, and causing the suction mechanisms in the dehydrating rolls to aspirate the water from the polymer may be cited. The suction mechanisms incorporated in the compressing rolls are so adapted as to vacuumize the central parts of the rolls and aspirate the treating liquid adhering to the surface or contained in the interior of a given porous cross-linked polymer. By the compressing rolls which are each furnished with such a suction mechanism, the eventual water content can be lowered. The compressing rolls may be made of a porous nip roll besides a metallic roll. This invention allows use of either of these materials.

When the compressing rolls are used, a given porous cross-linked polymer is transferred in the gap formed between 1–200, preferably 2–100, and particularly preferably 2–20 compressing rolls arranged in each of the vertically opposed rows and compressed till dehydration with the opposed rolls. In this case, the compressing rolls may be furnished each with a suction mechanism. To be specific, 1–20, preferably 1–10, and particularly preferably 1–5 series each formed of 1–50, preferably 2–30, and particularly preferably 2–10 compressing rolls arranged in each of vertically opposed rows are used to dehydrate a given porous cross-linked polymer by conveying the polymer through the gap between the vertically opposed rows of such compressing rolls. In this case, the compressing rolls used in each series may be identical or not identical in kind. By the same token, the compressing rolls used in individual series may be identical or not identical in kind.

The dehydrating time does not need to be restricted. The efficiency of production is decided by the ratio of dehydration and the speed of dehydration. Generally, the porous cross-linked polymer is preferably passed through the gap between the opposed rows of compressing rolls at a speed in the range of 0.5–150 m/min., preferably in the range of 2–100 m/min., and particularly preferably in the range of 5–75 m/min. If the speed falls short of 0.5 m/min., the shortage will possibly degrade the efficiency of production. Conversely, if the speed exceeds 150 m/min., the excess will possibly lower the efficiency of dehydration.

[III] Slicing of Porous Cross-Linked Polymer

The porous cross-linked polymer obtained by the steps described above is sliced in an expected thickness. For the slicing which is effected after the step of dehydration, any of the heretofore known devices for slicing a porous cross-linked polymer may be used without any modification. Generally, the porous cross-linked polymer which has been dehydrated is sliced by rotating a band knife nipped between guides. When a saw blade is used in the place of the band knife, the saw blade does not need to rely for its operation invariably on a rotational motion but may rely on a lengthwise, lateral, or vertical motion and it does not require the presence of any guide.

A horizontal endless band knife is available as one means to slice continuously a porous cross-linked polymer. A front view of this horizontal endless band knife is illustrated in FIG. 3, a cross-sectional view thereof in FIG. 4, and a schematic diagram depicting a slicing motion thereof in FIG. 5 and FIG. 6.

Figure 3:
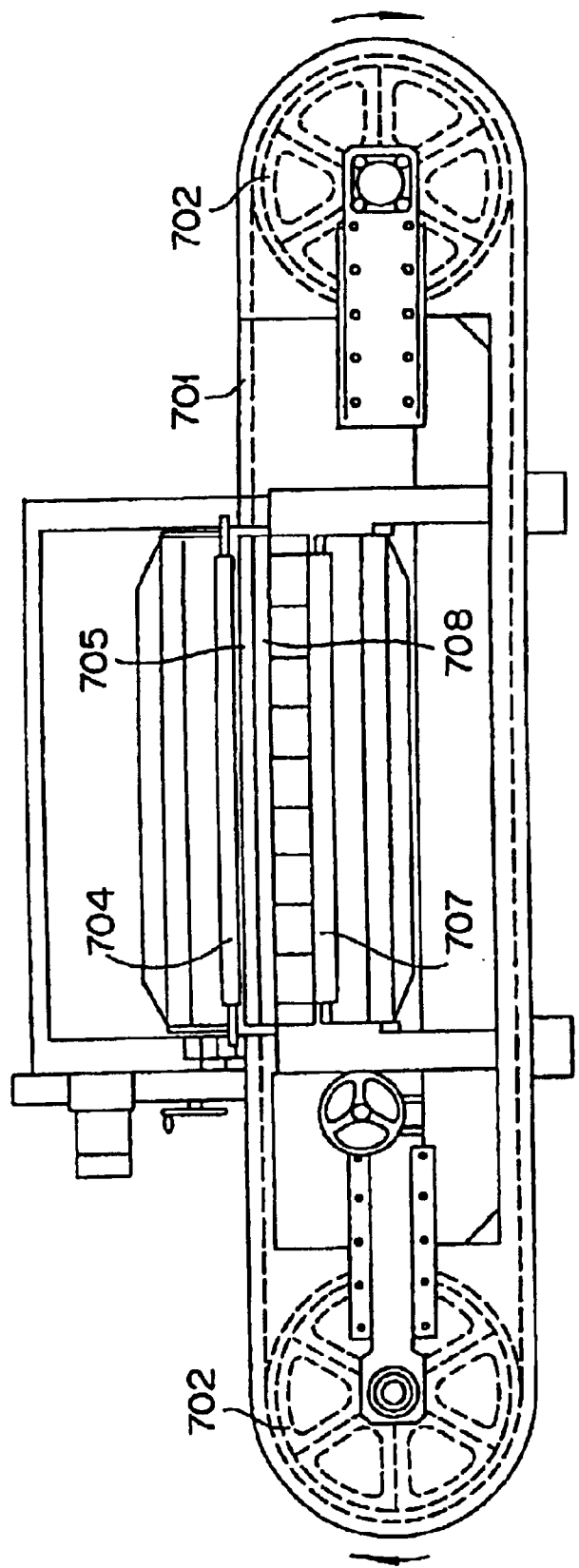
FIG. 3 is a front view of an endless band knife.
Figure 4:
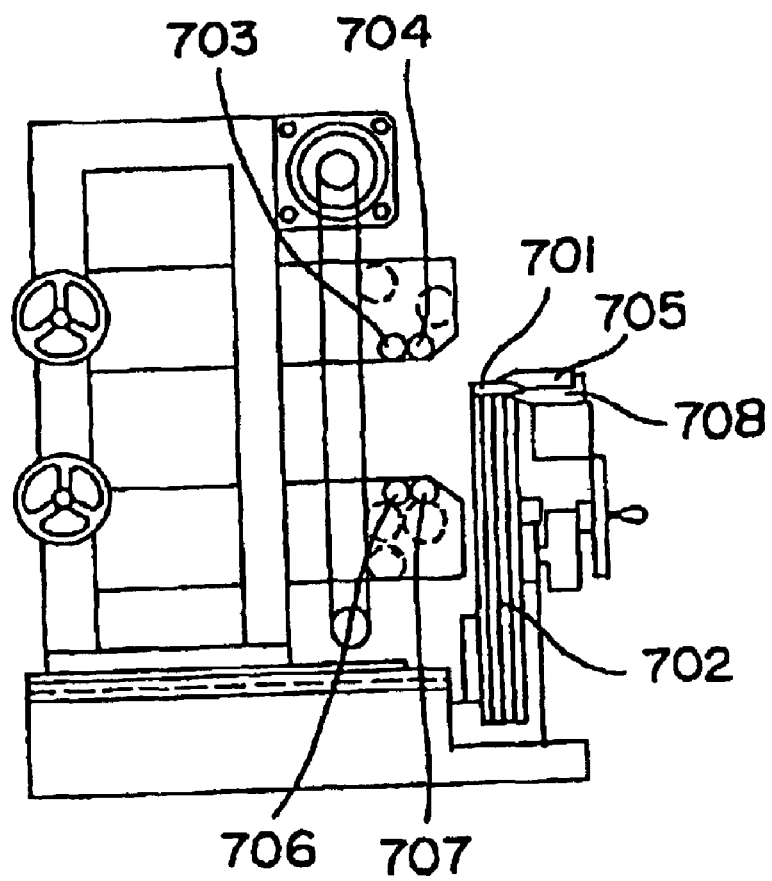
FIG. 4 is a side view of the endless band knife.

For a start, the endless band knife 701 mentioned above is driven as kept taut by band knife driving pulleys 702 disposed one each on the opposite sides as illustrated in FIG. 3. The porous cross-linked polymer of the form of a sheet has the position and the thickness thereof controlled by being passed between vertically opposed feed rollers 703, 706 and vertically opposed gauge rollers 704, 707 sequentially in the order named and then sliced vertically by the endless band knife 701 nipped by vertically opposed guides 705, 708.

Figure 5:
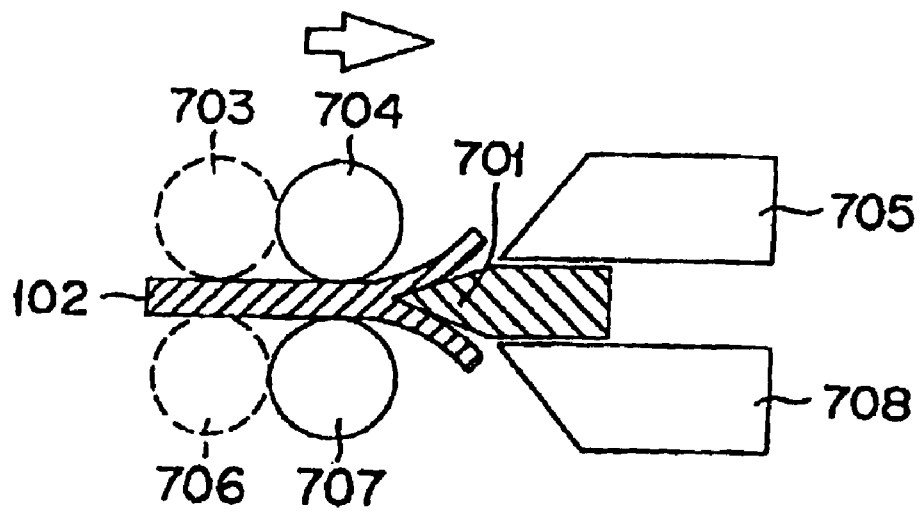
FIG. 5 is a schematic diagram of a slice obtained by the splitting method.
Figure 6:
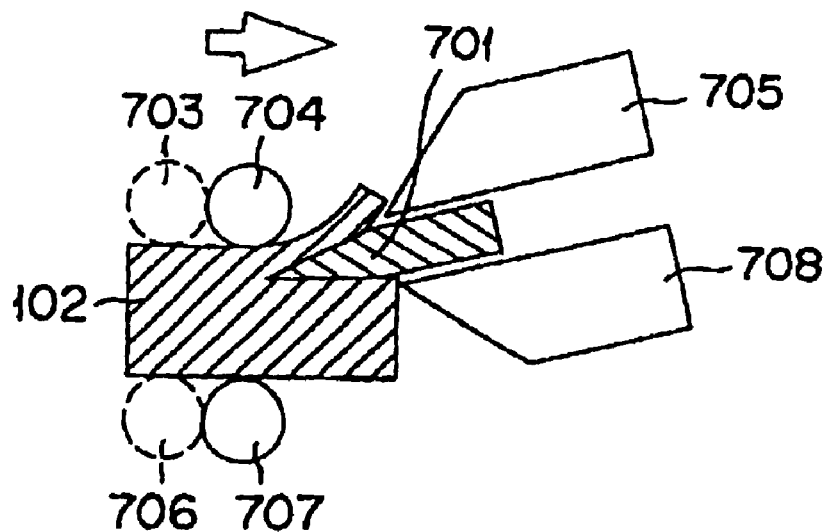
FIG. 6 is a schematic diagram of a slice obtained by the upper splitting method.

As a means to slice the polymer, the splitting method (halving method) illustrated as a slice in the schematic diagram of FIG. 5 and the upper splitting method illustrated as a slice in the schematic diagram of FIG. 6 are available. The splitting method illustrated in FIG. 5 consists in slicing the porous cross-linked polymer 102 by having the polymer kept transferred by the vertically opposed feed rollers 703, 706 and the vertically opposed gauge rollers 704, 707 and causing the band knife 701 to be inserted substantially horizontally into the polymer. The porous cross-linked polymer 102 which has been split is transferred along the vertically opposed guides 705, 708. The splitting method illustrated in FIG. 6 consists in slicing the porous cross-linked polymer 102 by having the porous cross-linked polymer 102 kept transferred by the vertically opposed feed rollers 703, 706 and the vertically opposed gauge rollers 704, 707 and causing the band knife 706 to be diagonally inserted into the polymer. The porous cross-linked polymer 102 which has been split is transferred along the vertically opposed guides 705, 708.

For the sheet of porous cross-linked polymer, the splitting method is generally judged to be more advantageous because the sliced faces produced thereby have excellent accuracy.

This invention does not impose any restriction on the slicing time to be spent on the porous cross-linked polymer which has been dehydrated. The efficiency of production is decided by the accuracy of the sliced face and the slicing speed. Generally, the porous cross-linked polymer is preferred to be passed through the slicer at a speed in the range of 0.5–150 m/min, preferably in the range of 2–100 m/min., and particularly preferably in the range of 5–75 m/min. If this slicing speed falls short of 0.5 m/min., the shortage will possibly degrade the efficiency of production. Conversely, if the speed exceeds 150 m/min., the excess will possibly degrade the accuracy of the sliced face.

The slicing thickness does not need to be particularly restricted but may be arbitrarily selected.

[IV] Porous Cross-Linked Polymer Sheet

The porous cross-linked polymer sheet of this invention is obtained by slicing a porous cross-linked polymer by the method described above. It may be subjected, when necessary, to after treatments. The after treatments include a compressing treatment, a dehydrating treatment, a washing treatment, a drying treatment, and such impregnating treatment and shredding treatment as are intended to impart prescribed characteristic properties to the polymer, for example.

(b) Compressing Treatment

The porous cross-linked polymer sheet of this invention may be compressed to one out of several parts of the original thickness. The compressed sheet has a small volume as compared with the original porous cross-linked polymer and permits a decrease in the cost of transportation and storage. The porous cross-linked polymer in the compressed state is characterized by manifesting, on exposure to a large quantity of water, the nature of resuming the original thickness by absorbing the water and effecting this absorption of water at a higher speed than when the polymer was in its original thickness.

For the impartation of the compressed state, it suffices to adopt a compressing means which conforms to the shape of a given porous cross-linked polymer and allows application of uniform pressure to the porous cross-linked polymer and consequently brings uniform compression of the polymer. Particularly to the porous cross-linked polymer in the form of a sheet, this impartation is accomplished simply by passing the polymer after the step of slicing between the opposed rolls or belts which have been adjusted to a prescribed distance. The compression of the porous cross-linked polymer at this step of compression is preferred to be performed at a temperature which is higher than the glass transition point of the porous cross-linked polymer. If this temperature is lower than the glass transition point of the polymer, the shortage will possibly break the porous structure of the polymer and change the pore diameter. From the viewpoint of saving the space for transportation and storage and exalting the ease of handling, it is effective to compress the polymer to not more than ½ of the original thickness and preferably to not more than ¼ of the original thickness.

(c) Washing Treatment

For the purpose of improving the porous cross-linked polymer sheet in the surface condition, for example, the porous cross-linked polymer may be washed with purified water, an aqueous solution containing an arbitrary additive, or a solvent. When the porous cross-linked polymer sheet which has been washed is dehydrated, this dehydration can be attained by the method of dehydration mentioned above. The ratio of dehydration in this case may be selected arbitrarily.

(d) Drying Treatment

The porous cross-linked polymer sheet obtained by the preceding steps, when necessary, may be thermally dried as with hot air or a microwave. It may be humidified with the object of adjusting the water content thereof.

(f) Impregnating Treatment

The porous cross-linked polymer sheet may be impregnated with such additives as the detergent, aromatizing agent, deodorant, and antibacterial agent with the object of being endowed with varied forms of functionality.

Embodiment

Now, this invention will be described more specifically with reference to working examples cited herein below. The bromine values of porous cross-linked polymers reported in the working examples were determined and rated as follows.

<Bromine Value>

The reagent solutions necessary for the determination of the bromine value were prepared and standardized as follows and used for determining the bromine values of the porous cross-linked polymers.

(1) Preparation of PSDB reagent: A solution obtained by placing 4±0.05 g of pyridine in 10 ml of glacial acetic acid and ice cooling them together and a solution obtained by placing 5±0.05 g of concentrated sulfuric acid in 10 ml of glacial acetic acid were mixed. The mixed solution and a solution obtained by placing 3.75±0.05 g of bromine in 10 ml of glacial acetic acid and ice cooling them were together diluted with glacial acetic acid to a total volume of 500 ml. The resultant diluted solution was placed in a brown vial and stored in a cool dark place.

(2) Preparation of aqueous 2.5% mercuric acetate solution: With glacial acetic acid, 2.5 g of mercuric acetate was diluted to a total volume of 500 ml. The solution thus prepared was put to use within one week of the preparation.

(3) Aqueous 30% potassium iodide solution: With water, 300 g of potassium iodide was diluted to a total volume of 1000 ml. The produced solution was stored in a cool dark place.

(4) Aqueous 1% starch solution: With water, 1 g of starch (soluble) was diluted to a total volume of 100 ml.

(5) Standard N/10 sodium thiosulfate solution: With water, 25.0 g of sodium thiosulfate (anhydrous) and 0.01 g of sodium carbonate (anhydrous) were together diluted to a total volume of 1000 ml.

(6) Standardization of standard N/10 sodium thiosulfate solution: In 250 ml of water, 1.0–1.5 g of potassium iodate (standard reagent, Mw=214.01) dried at 120° C.–140° C. and weighed out accurately was dissolved. The portion, 25 ml, of the resultant solution was placed in a flask provided with a ground-in stopper. The solution in the flask and 2 g of potassium iodide and (1+5)5 ml of sulfuric acid added thereto were together sealed immediately in the flask with the stopper, gently shaken, left standing in a dark place for 5 minutes, and then titrated with a standard N/10 sodium thiosulfate solution (indicator: the starch solution, added after the solution changed its color to a slightly yellow color). The value of f was calculated by the formula 1.

$$f=[6\times(\text{weight (g) of potassium iodate}/214.01)\times(1000/100)\times25]/[\text{Amount of titration (ml)}/0.1] \quad \text{Formula 1}$$

(7) Procedure for determination of bromine value:

(i) The action of swelling about 1 g of a given porous cross-linked polymer with purified water and dehydrating the swelled polymer was performed twice. Then, the resultant polymer was placed in a 1-L plastic vessel and washed by being stirred therein with 500 mL of purified water for one hour. The cured polymer was filtered with a filter paper (Whatman, GF/F, 47 mm in diameter).

(ii) The porous cross-linked polymer washed with the purified water was washed three times with acetone by the same manner as mentioned above. Since the third washing produced a finely broken cured polymer, this cured polymer was preferably stirred with the final solution. By the washing with the acetone, the double bond subjected to the determination of bromine value was turned not into a residual polymerizable monomer but into a cross-linking agent contained in the porous cross-linked polymer.

(iii) The porous cross-linked polymer separated by the filtration was dried under a vacuum at 65° C. for three hours with a vacuum drier (TABAI, Vacuumoven LHV-122).

(iv) In an iodine vial having an inner volume of 500 ml, 25 ml of a PSDB reagent was placed with a whole pipet and cooled in an ice bath to 0–10° C.

(v) About 0.1 g of the porous cross-linked polymer which had been washed and dried under a vacuum was weighed out accurately (W g) and placed in the iodine vial. Then, 25 ml of an aqueous 2.5% mercuric acetate solution was quickly added to the vial with the aid of a measuring cylinder. The vial containing the contents was sealed with a stopper, shaken, then immersed in an ice bath at 0–10° C., and stored for accurately 15 minutes (with the ground part of the stopper wetted thoroughly during the addition with the measuring cylinder).

(vi) The iodine vial was taken out of the dark place and, with 25 ml of an aqueous 30% potassium iodide solution placed in the liquid receiving part thereof, immersed in an ice bath as far as the ground-in part thereof, made to loose the stopper, and lightly swirled to allow gradual emanation of the contents. The vial was again stoppered, shaken for about 15 seconds, and then made to admit 100 ml of water while the stopper part thereof was washed with the aid of a measuring cylinder.

(vii) The contents of the vial was titrated with the standard N/10 sodium thiosulfate solution immediately after the washing. When they assumed a yellow color, the titration was continued in the presence of a 1% starch indicator till the color of starch iodide disappeared (A ml).

(viii) Separately, by way of a blank test, the titration was performed by following the procedure mentioned above while omitting the addition of a sample (B ml).

(8) Method for calculation of bromine value:

The bromine value (g/100 g) was calculated in accordance with Formula 2 shown below.

$$\text{Bromine value}=(B-A)\times f\times 0.799/W \quad \text{Formula 2}$$

(9) Determination of bromine value of oil phase:

The initial bromine value, namely the bromine value of the oil phase prior to polymerization was determined by following the same method as described above while using as the material for determination about 0.1 g of an oil phase (mixture of monomer and emulsifier) in the place of a porous cross-linked polymer obtained by drying under a vacuum.

EXAMPLE 1

An oil phase was prepared by adding 0.4 part by weight of diglycerine monooleate to a mixture composed of 5.0 parts by weight of 2-ethylhexyl acrylate and 3.0 parts by weight of 55% divinyl benzene and uniformly dissolving them together. Separately, a water phase was prepared by dissolving 8.0 parts by weight of calcium chloride and 0.2 part by weight of potassium persulfate in 395 parts by weight of purified water and it was then heated to 65° C. The oil phase and the water phase were continuously supplied at a ratio of 1/48 into a dynamic mixing device and mixed and emulsified to form an HIPE of which the oil phase had a bromine value of 130. By the use of a continuous polymerizing device formed of an endless steel belt and vertically opposed PET films, this HIPE was formed in a thickness of 20 mm and polymerized at a polymerizing temperature of 95° C. for a polymerizing time of 5 minutes at a polymerizing speed of 10 m/min to afford a porous cross-linked former-stage aggregate having a bromine value of 15. Thereafter, the vertically opposed PET films were rewound. The naked aggregate was reduced to a compressed state of not more than 70% of the original thickness by the use of a wringing dehydrator formed of 8 vertically opposed stainless steel compressing rolls and then passed through five series of the compressing rolls at a dehydrating speed of 10 m/min to decrease the water content thereof from 4800 w/w % to 1800 w/w %. As a result, a porous cross-linked former-stage polymer having a thickness of 10 mm was obtained. Subsequently, this polymer was successively sliced with three horizontal endless band knives at a slicing speed of 10 m/min to obtain four porous cross-linked former-stage polymer sheets having a thickness of 2.5 mm. The four sliced products were invariably free from such faults as fold, crack and adhesion of rust. Since they sustained a crack when they were folded, they were further polymerized continuously at a polymerizing temperature of 110° C. and a polymerizing speed of 10 m/min for two minutes and turned into porous cross-linked latter-stage polymers having a bromine value of 8. The four porous cross-linked latter-stage polymer sheets were further wrung till dehydration with compressing rolls to obtain four porous cross-linked polymer sheets having a water content of 400% and a thickness of 1 mm.

EXAMPLE 2

With the same continuous polymerizing device as used in Example 1, an HIPE produced in the same manner as in Example 1 was formed in a thickness of 20 mm and polymerized at a polymerizing temperature of 95° C., for a polymerizing time of 10 minutes, at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through ten series of the compressing rolls at a dehydrating speed of 20 m/min to decrease the water content thereof from 4800 w/w % to 400 w/w %. As a result, a polymer having a thickness of 4 mm was obtained. Subsequently, this polymer was successively sliced with three horizontal endless band knives at a slicing speed of 20 m/min to obtain four porous cross-linked polymer sheets having a thickness of 1 mm. The four sliced products were invariably free from such faults as fold, crack and adhesion of rust.

EXAMPLE 3

An HIPE produced in the same manner as in Example 1 was poured into a polymerizing vessel and batch polymerized at a polymerizing temperature of 65° C. for a polymerizing time of 16 hours to form a porous cross-linked polymer having a bromine value of 7. The polymer was withdrawn from the polymerizing vessel, cut into pieces 20 mm in thickness at a cutting speed of 0.5 m/min., reduced to a compressed state of not more than 70% of the original thickness with the same wringing dehydrator as used in Example 2, and passed through 10 series of compressing rolls at a wringing speed of 20 m/min to decrease the water content thereof from 4800 w/w % to 400 w/w %. As a result, a polymer having a thickness of 4 mm was obtained. The polymer was subsequently successively sliced with 3 horizontal endless band knives at a slicing speed of 20 m/min to afford four porous cross-linked polymer sheets having a thickness of 1 mm. The four sliced products were invariably free from such faults as fold, crack, and adhesion of rust.

EXAMPLE 4

An HIPE produced in the same manner as in Example 1 was formed in a thickness of 20 mm with the same continuous polymerizing device as used in Example 1 at a polymerizing temperature of 95° C. for a polymerizing time of 10 minutes at a polymerizing speed of 30m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through ten series of the compressing rolls at a dehydrating speed of 30 m/min. Subsequently, the polymer was passed through five series each formed of one vertically opposed porous vacuum suction nip rolls to decrease the water content thereof from 4800 w/w % to 200 w/w %. As a result, a polymer having a thickness of 4 mm was obtained. Subsequently, this polymer was successively sliced with three horizontal endless band knives at a slicing speed of 30 m/min to obtain four porous cross-linked polymer sheets having a thickness of 1 mm. The four sliced products were invariably free from such faults as fold, crack and adhesion of rust.

EXAMPLE 5

An oil phase was prepared by adding 0.4 part by weight of diglycerine monooleate to a mixture composed of 5.0 parts by weight of 2-ethylhexyl acrylate and 3.0 parts by weight of 55% divinyl benzene and uniformly dissolving them together. Separately, a water phase was prepared by dissolving 8.0 parts by weight of calcium chloride and 0.2 part by weight of potassium persulfate in 193.4 parts by weight of purified water and it was then heated to 65° C. The oil phase and the water phase were continuously supplied at a ratio of 1/24 into a dynamic mixing device and mixed and emulsified to form an HIPE. By the use of the same continuous polymerizing device as used in Example 1, this HIPE was formed in a thickness of 25 mm and polymerized at a polymerizing temperature of 95° C. for a polymerizing time of 10 minutes at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 2 vertically opposed stainless steel compressing rolls and then passed through two series of the compressing rolls at a dehydrating speed of 20 m/min to decrease the water content thereof from 2400 w/w % to 200 w/w %. As a result, a porous cross-linked polymer having a thickness of 25 mm was obtained. Subsequently, this polymer was successively sliced with five horizontal endless band knives at a slicing speed of 20 m/min to obtain five porous cross-linked former-stage polymer sheets having a thickness of 5 mm. The five sliced products were invariably free from such faults as fold, crack and adhesion of rust.

EXAMPLE 6

With the same continuous polymerizing device as used in Example 1, an HIPE produced in the same manner as in Example 5 was formed in a thickness of 35 mm and polymerized at a polymerizing temperature of 95° C., for a polymerizing time of 10 minutes, at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 4 vertically opposed stainless steel compressing rolls and then passed through two series of the compressing rolls at a dehydrating speed of 20 m/min to decrease the water content thereof from 2400 w/w % to 200 w/w %. As a result, a polymer having a thickness of 35 mm was obtained. Subsequently, this polymer was successively sliced with six horizontal endless band knives at a slicing speed of 20 m/min to obtain seven porous cross-linked polymer sheets having a thickness of 5 mm. The seven sliced products were invariably free from such faults as fold, crack and adhesion of rust.

EXAMPLE 7

An oil phase was prepared by adding 0.4 part by weight of diglycerine monooleate to a mixture composed of 5.0 parts by weight of 2-ethylhexyl acrylate and 3.0 parts by weight of 55% divinyl benzene and uniformly dissolving them together. Separately, a water phase was prepared by dissolving 8.0 parts by weight of calcium chloride and 0.2 part by weight of potassium per sulfate in 75.8 parts by weight of purified water. It was then heated to 65° C. The oil phase and the water phase were continuously supplied at a ratio of 1/10 into a dynamic mixing device and mixed and emulsified to form an HIPE. By the use of the same continuous polymerizing device as used in Example 1, this HIPE was formed in a thickness of 50 mm and polymerized at a polymerizing temperature of 95° C. for a polymerizing time of 10 minutes at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 4 vertically opposed stainless steel compressing rolls and then passed through two series of the compressing rolls at a dehydrating speed of 20 m/min to decrease the water content thereof from 1000 w/w % to 150 w/w %. As a result, a porous cross-linked polymer having a thickness of 50 mm was obtained. Subsequently, this polymer was successively sliced with nine horizontal endless band knives at a slicing speed of 20 m/min to obtain ten porous cross-linked former-stage polymer sheets having a thickness of 5 mm. The ten sliced products were invariably free from such faults as fold, crack and adhesion of rust.

EXAMPLE 8

With the same continuous polymerizing device as used in Example 1, an HIPE produced in the same manner as in Example 7 was formed in a thickness of 75 mm and polymerized at a polymerizing temperature of 95° C., for a polymerizing time of 10 minutes, at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through two series of the compressing rolls at a dehydrating speed of 20 m/min to decrease the water content thereof from 1000 w/w % to 200 w/w %. As a result, a polymer having a thickness of 75 mm was obtained. Subsequently, this polymer was successively sliced with nine horizontal endless band knives at a slicing speed of 20 m/min to obtain ten porous cross-linked polymer sheets having a thickness of 7.5 mm. The ten sliced products were invariably free from such faults as fold, crack and adhesion of rust.

EXAMPLE 9

An oil phase was prepared by adding 0.4 part by weight of diglycerine monooleate to a mixture composed of 5.0 parts by weight of 2-ethylhexyl acrylate and 3.0 parts by weight of 55% divinyl benzene and uniformly dissolving them together. Separately, a water phase was prepared by dissolving 8.0 parts by weight of calcium chloride and 0.2 part by weight of potassium persulfate in 537.8 parts by weight of purified water and it was then heated to 65° C. The oil phase and the water phase were continuously supplied at a ratio of 1/65 into a dynamic mixing device and mixed and emulsified to form an HIPE. By the use of the same continuous polymerizing device as used in Example 1, this HIPE was formed in a thickness of 15 mm and polymerized at a polymerizing temperature of 95° C. for a polymerizing time of 10 minutes at a polymerizing speed of 20 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through 15 series of the compressing rolls at a dehydrating speed of 20 m/min to decrease the water content thereof from 6500 w/w % to 400 w/w %. As a result, a porous cross-linked polymer having a thickness of 3 mm was obtained. Subsequently, this polymer was successively sliced with two horizontal endless band knives at a slicing speed of 20 m/min to obtain three porous cross-linked former-stage polymer sheets having a thickness of 1 mm. The three sliced products were invariably free from such faults as fold, crack and adhesion of rust.

Comparative Example 1

With the same continuous polymerizing device as used in Example 1, an HIPE produced in the same manner as in Example 1 was formed in a thickness of 20 mm and polymerized at a polymerizing temperature of 95° C., for a polymerizing time of 10 minutes, at a polymerizing speed of 10 m/min to afford a porous cross-linked polymer having a bromine value of 8. Thereafter, the vertically opposed PET films were rewound. The naked polymer retaining a water content of 4800 w/w % because of omission of dehydration and having a thickness of 20 mm was successively sliced with three horizontal endless band knives at a slicing speed of 10 m/min to obtain four porous cross-linked polymer sheets having a thickness of 5 mm. Since the four sliced products invariably sustained a fold, produced cracks copiously, and showed a clear sign of adhesion of rust, a sliced sheet product retaining the shape intact and showing no sign of adhesion of rust could not be obtained.

Comparative Example 2

An HIPE produced in the same manner as in Example 1 was poured into a polymerizing vessel and batch polymerized therein at a temperature of 65° C. for a polymerizing time of 16 hours to obtain a porous cross-linked polymer having a bromine value of 7 in the polymerizing vessel. The cross-linked polymer was withdrawn from the polymerizing vessel, cut in a thickness of 20 mm at a cutting speed of 0.5 m/min., cut in the original state retaining a water content of 4800 w/w % because of the omission of dehydration and having a thickness of 20 mm with three horizontal endless band knives at a slicing speed of 10 m/min to afford four porous cross-linked polymer sheets having a thickness of 5 mm. Since the four sliced products invariably sustained a fold, produced cracks copiously, and showed a clear sign of adhesion of rust, a sliced sheet product retaining the shape intact and showing no sign of adhesion of rust could not be obtained.

EXAMPLE 10

With the same continuous polymerizing device as used in Example 1, an HIPE produced in the same manner as in Example 1 was formed in a thickness of 10 mm and polymerized at a polymerizing temperature of 95° C., for a polymerizing time of 10 minutes, at a polymerizing speed of 5 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through five series of the compressing rolls at a dehydrating speed of 5 m/min to decrease the water content thereof from 4800 w/w % to 400 w/w %. As a result, a polymer having a thickness of 2 mm was obtained. Subsequently, this polymer was successively sliced with three horizontal endless band knives at a slicing speed of 5 m/min to obtain four porous cross-linked polymer sheets having a thickness of 0.5 mm. The four sliced products were invariably free from such faults as fold, crack and adhesion of rust.

EXAMPLE 11

With the same continuous polymerizing device as used in Example 1, an HIPE produced in the same manner as in Example 5 was formed in a thickness of 4 mm and polymerized at a polymerizing temperature of 95° C., for a polymerizing time of 10 minutes, at a polymerizing speed of 10 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 2 vertically opposed stainless steel compressing rolls and then passed through one series of the compressing rolls at a dehydrating speed of 10 m/min to decrease the water content thereof from 2400 w/w % to 200 w/w %. As a result, a polymer having a thickness of 4 mm was obtained. Subsequently, this polymer was successively sliced with seven horizontal endless band knives at a slicing speed of 10 m/min to obtain eight porous cross-linked polymer sheets having a thickness of 0.5 mm. The eight sliced products were invariably free from such faults as fold, crack and adhesion of rust.

EXAMPLE 12

With the same continuous polymerizing device as used in Example 1, an HIPE produced in the same manner as in Example 1 was formed in a thickness of 5 mm and polymerized at a polymerizing temperature of 95° C., for a polymerizing time of 10 minutes, at a polymerizing speed of 5 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 8 vertically opposed stainless steel compressing rolls and then passed through three series of the compressing rolls at a dehydrating speed of 5 m/min to decrease the water content thereof from 4800 w/w % to 400 w/w %. As a result, a polymer having a thickness of 1 mm was obtained. Subsequently, this polymer was successively sliced with three horizontal endless band knives at a slicing speed of 5 m/min to obtain four porous cross-linked polymer sheets having a thickness of 0.25 mm. The four sliced products were invariably free from such faults as fold, crack and adhesion of rust.

EXAMPLE 13

With the same continuous polymerizing device as used in Example 1, an HIPE produced in the same manner as in Example 5 was formed in a thickness of 2 mm and polymerized at a polymerizing temperature of 95° C., for a polymerizing time of 10 minutes, at a polymerizing speed of 10 m/min to afford a porous cross-linked polymer having a bromine value of 8. Thereafter, the vertically opposed PET films were rewound. The naked polymer was reduced to a compressed state of not more than 70% of the original thickness by the use of a wringing dehydrator formed of 2 vertically opposed stainless steel compressing rolls and then passed through one series of the compressing rolls at a dehydrating speed of 10 m/min to decrease the water content thereof from 2400 w/w % to 200 w/w %. As a result, a polymer having a thickness of 2 mm was obtained. Subsequently, this polymer was successively sliced with seven horizontal endless band knives at a slicing speed of 10 m/min to obtain eight porous cross-linked polymer sheets having a thickness of 0.25 mm. The eight sliced products were invariably free from such faults as fold, crack and adhesion of rust.

TABLE 3

| | W/O ratio of HIPE | Porous cross-linked polymer | | Method of wringing dehydration | | Porous cross-linked polymer after dehydration | | | Slicing treatment | | |
|---|---|---|---|---|---|---|---|---|---|---|---|
| | | Thickness (mm) | Method of polymerization | Number of rolls | Number of series | Water content (w/w %) | Ratio of dehydration (w/w %) | Thickness (mm) | Thickness (mm) | Number of sliced pieces | Slicing Speed (m/min.) |
| Example 1 | 48/1 | 20 | continuous | 8 | 5 | 1800 | 63 | 10++ | 2.5 | 4 | 10 |
| | | | | | | 400** | 92** | 4++ | 1* | 4* | 10* |
| Example 2 | 48/1 | 20 | continuous | 8 | 10 | 400 | 92 | 4++ | 1 | 4 | 20 |
| Example 3 | 48/1 | 20 | batchwise+ | 8 | 10 | 400 | 92 | 4++ | 1 | 4 | 20 |
| Example 4 | 48/1 | 20 | continuous | 8 | 10 | 200 | 96 | 4++ | 1 | 4 | 30 |
| | | | | 1 | 5 | | | | | | |
| Example 5 | 24/1 | 25 | continuous | 2 | 2 | 200 | 92 | 25 | 5 | 5 | 20 |
| Example 6 | 24/1 | 35 | continuous | 4 | 2 | 200 | 92 | 35 | 5 | 7 | 20 |
| Example 7 | 10/1 | 50 | continuous | 4 | 2 | 150 | 85 | 50 | 5 | 10 | 20 |
| Example 8 | 10/1 | 75 | continuous | 8 | 2 | 200 | 80 | 75 | 7.5 | 10 | 20 |
| Example 9 | 65/1 | 15 | continuous | 8 | 15 | 400 | 94 | 3++ | 1 | 3 | 20 |
| Example 10 | 48/1 | 10 | continuous | 8 | 5 | 400 | 92 | 2++ | 0.5 | 4 | 5 |
| Example 11 | 24/1 | 4 | continuous | 2 | 1 | 200 | 92 | 4 | 0.5 | 8 | 10 |
| Example 12 | 48/1 | 5 | continuous | 8 | 3 | 400 | 92 | 1++ | 0.25 | 4 | 5 |
| Example 13 | 24/1 | 2 | continuous | 2 | 1 | 200 | 92 | 2 | 0.25 | 8 | 10 |
| Comparative example 1 | 48/1 | 20 | continuous | no wringing dehydration | | 4800 | 0 | 20 | 5 | 4 | 10 |
| Comparative example 2 | 48/1 | 20 | batchwise | no wringing dehydration | | 4800 | 0 | 20 | 5 | 4 | 10 |

+: Sliced in prescribed thickness after batch polymerization
++: Compression
*: Numerical value subsequent to latter-stage polymerization
**: Two-stage dehydration

Industrial Applicability

This invention is directed to providing a method for producing a porous cross-linked polymer sheet by hydrating and then slicing a porous cross-linked polymer obtained from an HIPE. By slicing the polymer which has been dehydfrated by a compressing operation till a prescribed water content, this invention is enabled to provide a method for producing a porous cross-linking polymer sheet of high quality with excellent productivity.

What is claimed is:

1. A method for the production of a porous cross-linked polymer sheet, comprising a step for obtaining a porous cross-linked polymer by forming and polymerizing a water-in-oil type high internal phase emulsion, a step for dehydrating the porous cross-linked polymer, and a step for subsequently slicing the porous cross-linked polymer.

2. A method for the production of a porous cross-linked polymer sheet, comprising a step for obtaining a porous cross-linked former-stage polymer by forming a water-in-oil type high internal phase emulsion and subjecting the formed water-in-oil type high internal phase emulsion to a former-stage polymerization, a step for dehydrating the porous cross-linked former-stage polymer, a step of subsequently slicing the porous cross-linked former-stage polymer into pieces of a prescribed thickness, and a step for subjecting the porous cross-linked former-stage polymer to a latter-stage polymerization thereby obtaining a porous cross-linked polymer.

3. A method according to claim 2, which further comprises a step of dehydrating said porous cross-linked polymer subsequent to said step of obtaining said porous cross-linked polymer.

4. A method according to claim 1, wherein the step of dehydrating the porous cross-linked polymer or the porous cross-linked former-stage polymer is carried out by a compressing operation.

5. A method according to claim 1, wherein the porous cross-linked polymer has a thickness of not more than 100 mm prior to said dehydration.

6. A method according to claim 2, wherein the step of dehydrating the porous cross-linked polymer or the porous cross-linked former-stage polymer is carried out by a compressing operation.

7. A method according to claim 3, wherein the step of dehydrating the porous cross-linked polymer or the porous cross-linked former-stage polymer is carried out by a compressing operation.

8. A method according to claim 2, wherein the porous cross-linked former-stage polymer or the porous cross-linked polymer has a thickness of not more than 100 mm prior to said dehydration.

9. A method according to claim 3, wherein the porous cross-linked former-stage polymer or the porous cross-linked polymer has a thickness of not more than 100 mm prior to said dehydration.

10. A method according to claim 4, wherein the porous cross-linked polymer has a thickness of not more than 100 mm prior to said dehydration.

11. A method according to claim 6, wherein the porous cross-linked former-stage polymer or the porous cross-linked polymer has a thickness of not more than 100 mm prior to said dehydration.

12. A method according to claim 7, wherein the porous cross-linked former-stage polymer or the porous cross-linked polymer has a thickness of not more than 100 mm prior to said dehydration.

* * * * *